Jan. 17, 1933.  H. FROMM  1,894,858
FRUIT JUICE EXTRACTOR
Filed May 20, 1931  2 Sheets-Sheet 1
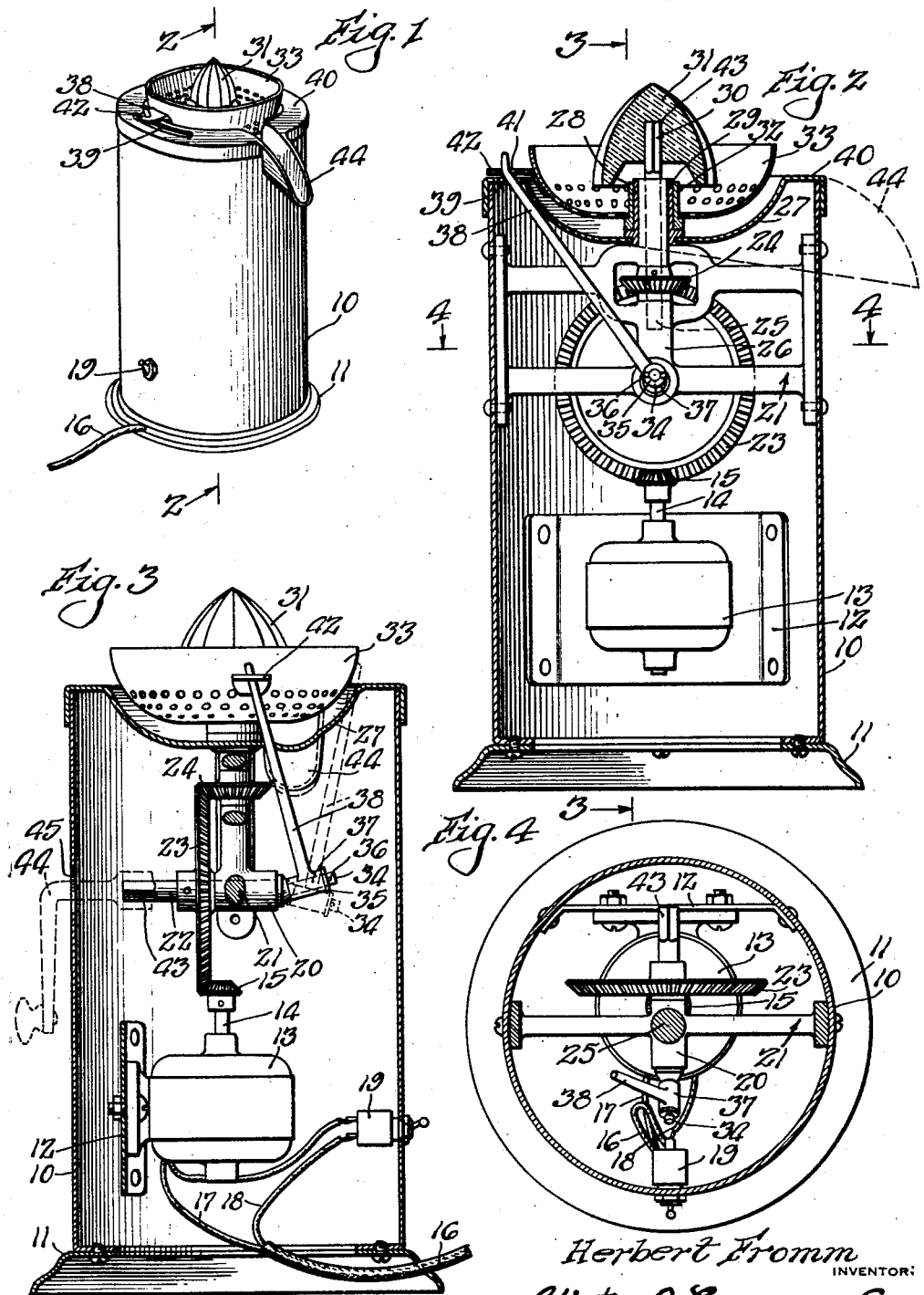
Herbert Fromm
INVENTOR
BY Victor J. Evans & Co.
HIS ATTORNEYS.

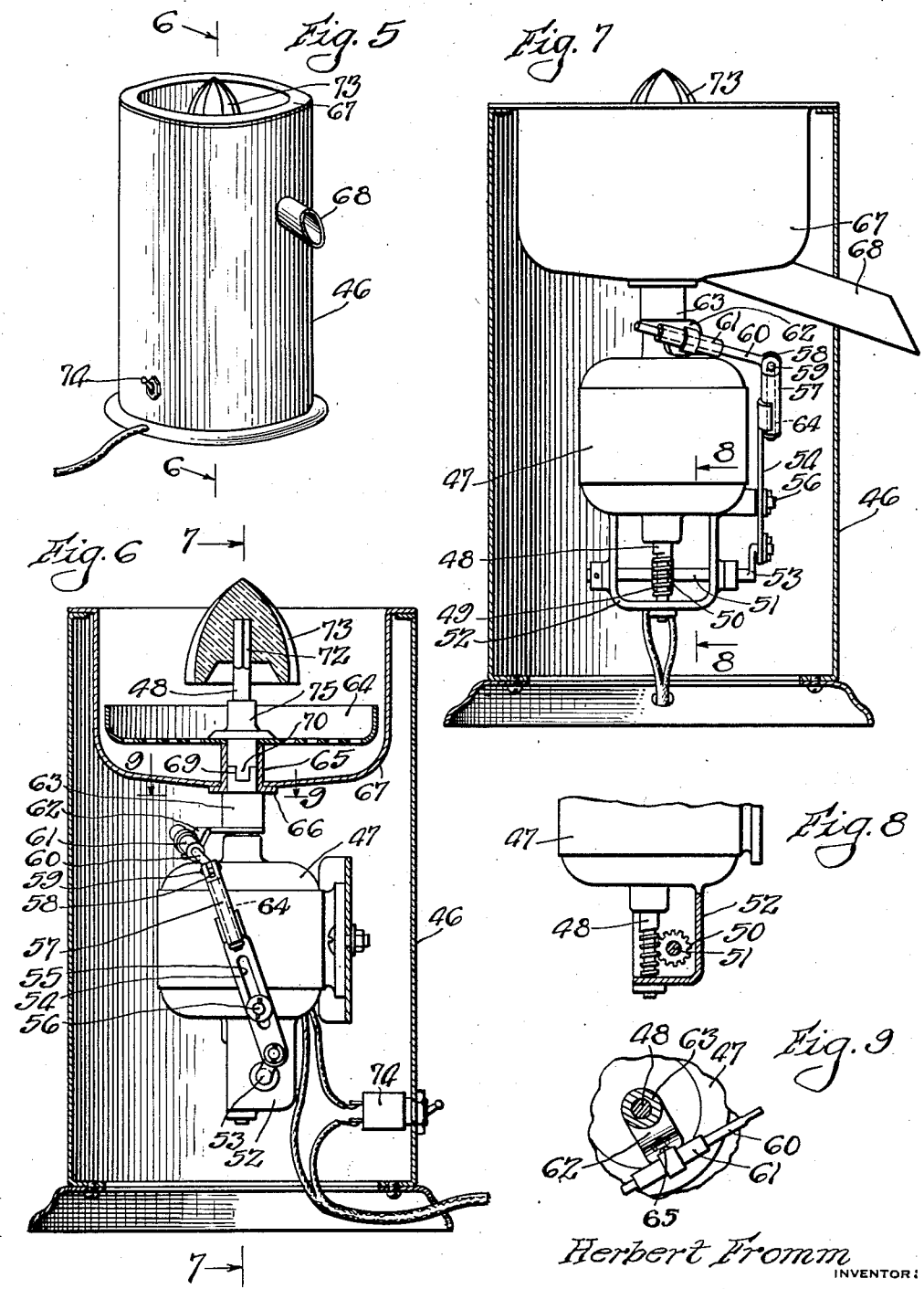

Patented Jan. 17, 1933

1,894,858

UNITED STATES PATENT OFFICE

HERBERT FROMM, OF HAMBURG, WISCONSIN

FRUIT JUICE EXTRACTOR

Application filed May 20, 1931. Serial No. 538,849.

This invention relates to certain novel improvements in fruit juice extractors, and has for its principal object the provision of an improved construction of this character which will be highly efficient in use and economical in manufacture.

In the extraction of fruit juices by means of a rotary reamer and a strainer, experience teaches that the effectiveness of such devices is reduced when the strainer is either stationary or rotatable with respect to the reamer, since in either of these two arrangements the fiber separated from the fruit clogs the strainer and prevents the juice from flowing therethrough; and experience also teaches that the best results are obtained, and the juice most effectively separated from the fiber, when the strainer is oscillatory and the reamer rotary. It is, therefore, the primary object of this invention to provide an improved juice extractor embodying a rotary reamer and an oscillatory strainer.

Another object of the invention consists in constructing the extractor in such a manner that the parts thereof may be readily removed for the purpose of cleaning the same.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of the invention as assembled;

Fig. 2 is a vertical sectional view on line 2—2 in Fig. 1;

Fig. 3 is a vertical sectional view on line 3—3 in Fig. 2;

Fig. 4 is a transverse sectional view on line 4—4 in Fig. 2;

Fig. 5 is a perspective view of a modified form of construction;

Fig. 6 is a sectional view on line 6—6 in Fig. 5;

Fig. 7 is a sectional view on line 7—7 in Fig. 6;

Fig. 8 is a sectional view on line 8—8 in Fig. 7; and

Fig. 9 is a sectional view on line 9—9 in Fig. 6.

In the drawings, which illustrate practical embodiments of the invention, and referring now particularly to Figs. 1 to 4, a casing is indicated at 10 and this casing is mounted upon a base 11. Supported within the casing 10 by a bracket structure 12 attached thereto is a motor 13 which includes a shaft 14 that carries a bevel gear 15. An outlet cord 16 carries conductors 17 and 18 through the casing to the motor, and a switch 19 is connected in series with the conductor 18.

Journaled in a bearing 20 that is formed as part of a bracket 21 which is attached to the casing, is a shaft 22 which has keyed thereto a bevel gear 23 which meshes with the gear 15. The gear 23 also meshes with a bevel gear 24 which is keyed to a shaft 25 that is journaled in a bearing socket formed as a part 26 of the bracket 21.

A juice receptacle 27 is removably mounted in, and so as to close, the open upper end of the casing 10 and this receptacle 27 carries a bearing sleeve 28 through which a bushing 29 projects, the bushing 29 being formed as part of the bracket 21 and housing the shaft 25, which has a squared upper end 30 carrying the reamer 31. The reamer 31 is removably mounted on the squared end 30 of shaft 25 by means of a socket 43 formed in the reamer to receive the shaft portion 30. A bearing 32 is provided about the sleeve 28 and the strainer 33 is attached to this bearing sleeve 32.

The shaft 22 has an angled end portion 34 on which is retained, by a washer 35 and key 36, a collar 37 with which is integral an arm 38 which projects upwardly through a slot 39 formed in the flange 40 of the receptacle 37. The upper end of arm 38 projects through an aperture 41 formed in an ear 42 of the strainer 33.

When the switch 19 is closed, the motor 13 will be operated and also shaft 14, which will rotate gear 15, gear 23, gear 24, shaft 25, and reamer 31. Since gear 23 is keyed to shaft 22, shaft 22 and its angled end 34 will also be rotated and by reason of the fact that the angled end 34 of shaft 22 is eccentric with respect to the main part or body of the shaft 22, the collar 37 and arm 38 will be oscillated back and forth between dotted and full line positions of Fig. 3, as shaft 22 is rotated. Obviously, this movement of arm 38 will oscillate the strainer 33. Therefore, the reamer 31 will be continuously rotated while the strainer 33 is oscillated and since the juice and fiber extracted from a fruit, by the reamer 31, will fall into the strainer 33, the oscillatory movement of the strainer will separate the juice from the fiber and the juice will flow from strainer 33 into receptacle 27, and thence out of the receptacle spout 44.

To clean the parts, the reamer 31 may be lifted from squared shaft end 30, the strainer 33 and its sleeve 32 may then be lifted from bearing sleeve 28 and arm 38, and receptacle 27 may be lifted from its position on casing 10. While one practical structure for converting the rotary movement of the reamer operating shaft 22 into oscillatory movement of the strainer has been described, other means for accomplishing this result are within the purview of this invention.

The shaft 22 has a squared end 43 to which may be detachably fastened a manually operable crank 44 (Fig. 3) that is adapted to be inserted through an opening 45 in the wall of casing 10 so that the extractor may be manually operated if desired, or in case the motor 13 should fail to operate.

In the modified form of construction shown in Figs. 5 to 9, inclusive, a casing is indicated at 46 and within which is mounted motor 47 having a shaft 48 provided with a worm 49 that meshes with gear 50 on shaft 51. Shaft 51 is journaled in bracket 52 and carried by this shaft 51 is a bell crank 53 upon which is rotatively mounted a link 54 provided with an elongated slot 55 through which projects an arm 56 that extends out from the bracket 52.

Attached to the upper end of link 54 is a tubular member 57 in which is slidably mounted a rod member 64, the upper end of which is bifurcated, as at 58, and pivotally mounted within this bifurcated head 58, on pintle 59, is a plunger 60 which reciprocates in and out of a sleeve 61 that is pivotally attached at 65 to a bracket 62. Attached to the bracket 62 is a bearing collar 63 upon which the strainer 64 is mounted for oscillatory movement by means of sleeve 65. Below the strainer 64 and supported on a flange 66 of sleeve 65 is the juice receiving receptacle 67 which is provided with an outlet spout 68. The upper end of collar 63 is reduced and bifurcated, as at 69, to receive the end portion 70 of collar 75 which is soldered to strainer 64 and in this collar 75 is rotatively disposed the shaft 48 which has a squared end 72 upon which the reamer 73 is detachably mounted for rotation.

By closing switch 74 to motor 47 shaft 48 will be rotated and obviously likewise reamer shaft 71 and reamer 73. This rotary movement of shaft 48 will be conveyed by worm 49 and gear 50 to shaft 51 which will rotate and eccentrically oscillate the link 54 on arm 56 which projects through slot 55 in the link 54. This eccentric oscillation of link 54 will be conveyed to arm 57 which, in turn, will reciprocate plunger 60 into and out of sleeve 61, which pivots at 65 relative to bracket 62, while rod member 64 rocks or rotates back and forth in tube 57, thereby oscillating bracket 62 and collar 63 upon shaft 48 and thus oscillating the strainer 64, with the advantages hereinbefore related for the first described form of the invention.

To clean the parts in the form of the invention shown in Figs. 5 to 9, obviously reamer 73 may be lifted from squared shaft end 72, after which the collar 75 and strainer 64 may be lifted from shaft 48, by removing collar end portion 70 from the bifurcated head 69 of collar 73.

From the foregoing description of the invention, therefore, it will be seen that the invention provides an improved fruit juice extractor and one which will facilitate the separation of the juice from the fiber as both juice and fiber are removed from the fruit by the reamer.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A juice extractor, comprising a rotative reamer, an oscillatory strainer co-axially mounted with respect to the reamer, rotative driven means for operating said reamer, and means associated with said driven means for converting the rotary movement thereof into oscillatory movement of said strainer.

2. A juice extractor comprising a rotative reamer, an oscillatory strainer, means including a rotative shaft for operating the reamer and said shaft having an angled end portion eccentric with respect to the body of the shaft, and an arm having one end floating on said angled end portion for converting the eccentric movement thereof into oscillatory movement of said strainer.

3. A juice extractor comprising a rotative reamer, a strainer co-axially mounted with respect to the reamer, operating means for said reamer including a rotative driven shaft having an eccentric end portion, and means for converting the eccentric rotary movement of said end portion into oscillatory movement of said strainer.

4. A juice extractor comprising a rotative reamer, an oscillatory strainer co-axially mounted with respect to the strainer, operating means for said reamer including a rotative driven shaft, and means for converting rotary movement of said shaft into oscillatory movement for operating said strainer.

5. A juice extractor comprising a rotative reamer, an oscillatory strainer coaxially mounted with respect to the reamer, and means for operating the reamer and the strainer, said operating means being effective to rotate the reamer and to oscillate the strainer while rotating the reamer.

In testimony whereof I affix my signature.

HERBERT FROMM.